N. D. NIELSEN.
AGITATOR.
APPLICATION FILED SEPT. 4, 1917.

1,268,601.

Patented June 4, 1918.
2 SHEETS—SHEET 1.

Inventor
Niels D. Nielsen
By F. O. Richey
Atty.

N. D. NIELSEN.
AGITATOR.
APPLICATION FILED SEPT. 4, 1917.

1,268,601.

Patented June 4, 1918.
2 SHEETS—SHEET 2.

UNITED STATES PATENT OFFICE.

NIELS D. NIELSEN, OF ELYRIA, OHIO.

AGITATOR.

1,268,601.  Specification of Letters Patent.  Patented June 4, 1918.

Application filed September 4, 1917. Serial No. 189,712.

*To all whom it may concern:*

Be it known that I, NIELS D. NIELSEN, a citizen of the United States, residing at Elyria, in the county of Lorain and State of Ohio, have invented certain new and useful Improvements in Agitators; and I do hereby declare the following to be a full, clear, and exact description of the invention, such as will enable others skilled in the art to which it appertains to make and use the same.

My invention relates to improvements in apparatus for agitating the contents of such vessels as tanks, vats and the like.

One of the objects of my invention is to provide means which will more quickly, thoroughly, effectively and uniformly expose the contents of the tank to the heating or cooling effect of the walls of the containing vessel. It is highly desirable to realize these results by the use of cheap and convenient devices for that purpose. I aim to provide apparatus cheap to construct and cheap and convenient to operate.

It will be obvious also that my invention may be employed for other uses and realize other results.

These and other objects of my invention and the invention itself will be better understood from a description of an embodiment of the invention.

Figure 1:
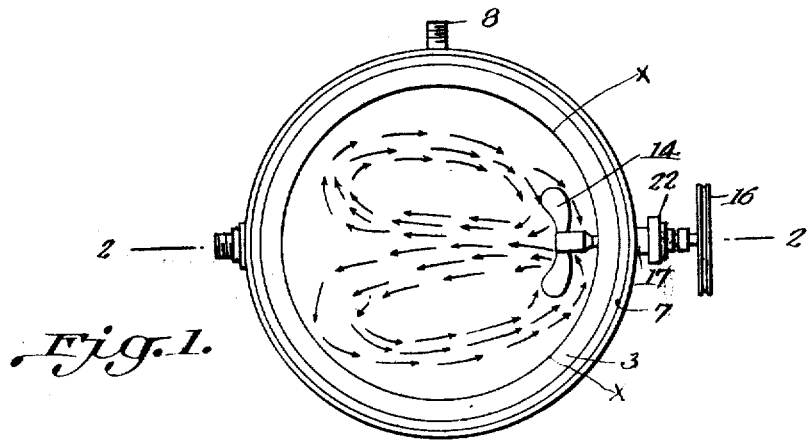
Figure 2:
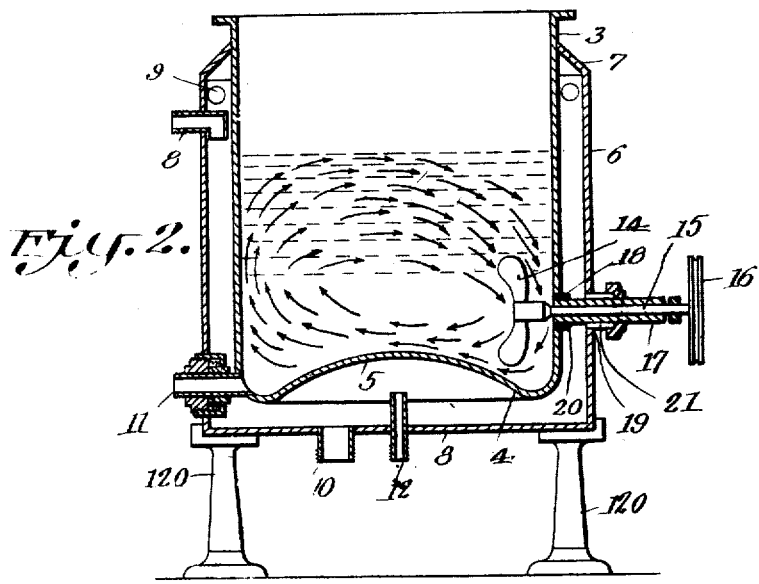
Figure 3:
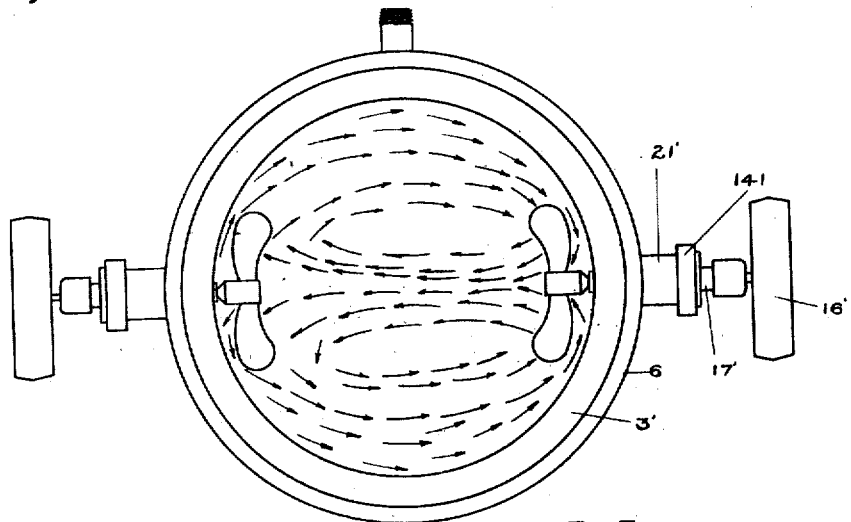
Figure 4:
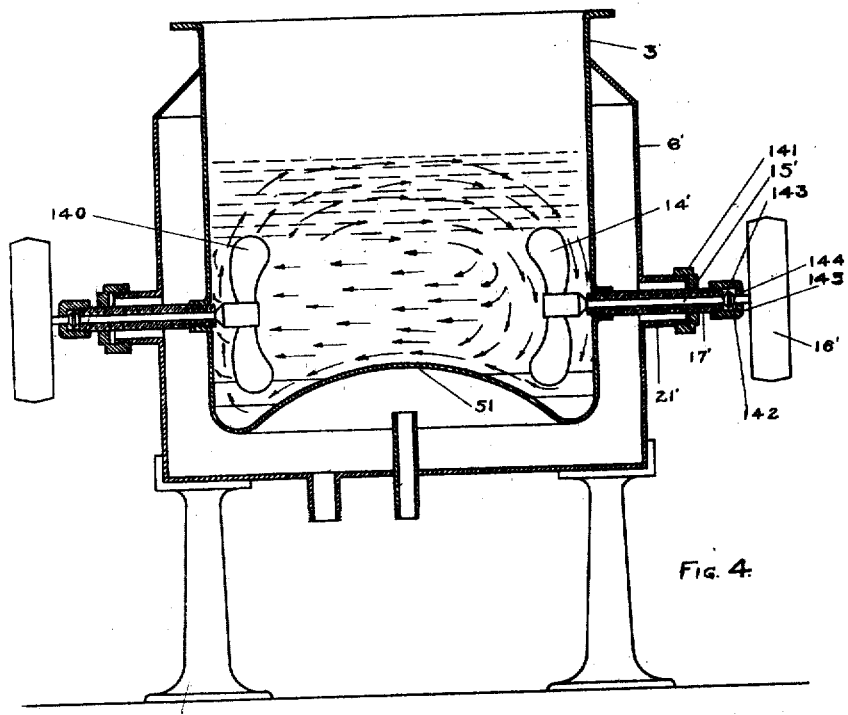

Figure 1 is a top plan view of apparatus showing an embodiment of my invention. Fig. 2 is a sectional view through the line 2—2 of Fig. 1. Figs. 3 and 4 are similar views of a second embodiment of my invention.

Referring now to the drawing and to the embodiment of the invention shown therein, at 3 is shown a vessel which here consists of a tank substantially cylindrical in shape and provided with a bottom 4. In the embodiment shown the bottom is provided with a reëntrant portion 5 which here is uniformly curved in the shape of a portion of a sphere and encompasses substantially the whole of the bottom of the vessel. It will be obvious, however, that any suitable form of bottom or side wall may be employed that will realize the results sought for in the invention.

The tank, as shown, is surrounded by a jacket 6, which is closed at the top 7 and provided with a bottom 8, here shown as substantially flat. The jacket may be employed either for heating or cooling means.

Ducts are shown at 8 and 9 for introducing to the jacket heating or cooling agencies, and a duct is shown at 10 for withdrawing the same from the jacket. Ducts are shown at 11 and 12 for introducing or withdrawing material from the tank itself.

Supporting members for the tank are shown at 120. Apparatus is provided for driving the contents of the tank laterally against the inner wall of the projection 5 and thence against the inclined side walls of the vat. A device especially adapted for this purpose is shown at 14 and consists of a propeller mounted upon a shaft 15, upon which there is mounted a pulley 16, through which the shaft and propeller 15 are driven. The shaft 15 extends through a hollow member 17, which passes through an opening 18 in the tank and an opening 19 in the jacket. Packing 20 and 21 is employed about the hollow member 17 in the openings 18 and 19 to prevent leakage. A collar 22 is provided on the outside of the packing 21 to secure the same and retain it in position.

In the operation of the device illustrated in the drawing the propeller is rotated through the pulley 16 and the contents of the tank are driven against the inner side of the projection 5, which deflects it upward so that it strikes the opposite curved wall of the tank and not only passes upward over and downward in a cycle as illustrated by the arrows in Fig. 2, but is deflected by the inclined side walls of the tank so that it runs around in either direction in a cycle, as illustrated in Fig. 1. Some of the fluid will be carried around in a vertical plane by the propeller and cast against the side walls of the tank at and adjacent the points X. The walls of the tank being curved or inclined at these places, the liquid thus cast against these parts of the side walls will be deflected at various angles into the stream indicated by the arrows in Fig. 1. As will be clearly seen, the contents of the vat are not only exposed to the bottom, but are carried around the side walls thereof. I have found by actual experiment, that the time required to change the temperature of the contents of a vessel in which my invention is employed is greatly reduced over that required in the older methods, under the same conditions, and that the cooling or heating effect is much more uniform throughout the contents.

In the embodiment shown in Figs. 3 and 4, the vessel is shown at 3' and the projection here illustrated as a reëntrant bottom at 5'. The surrounding jacket is shown at 7'. At 14' is shown an agitator which drives the liquid contents against the projection 5' and toward the agitator 140. The agitator 14' is mounted on a shaft 15' journaled in a bearing 17', which is mounted in the walls of the vessel 3' and the jacket 6'. Suitable means are provided, here shown as a pulley 16', through which the agitator 14' may be driven.

The pulley 16' is rigidly fastened on the shaft 17' and is rotated therewith. The jacket 6' is provided with a nipple 21' upon the end of which a cap 141 is connected and furnishes a bearing for the journal 17'. The shaft 15' is provided with means to retain the shaft in position, and at the same time permitting a slight play of the parts. If the shaft moves to the left the conical surface 143 of the member 142 will engage the end of the journal 17' and should said shaft move to the right, the conical surface 144 will engage the inner wall of the cap 145 fastened by some suitable means, such as threads, to the end of part 17'. When the agitator 14' is operated to cause a thrust outward, the surface 144 will engage the inner part of the cap 145 furnishing a tightly closed thrust bearing and when 14' is operated to cause it to draw the parts to the left, the surface 143 will cause a similar tightly closed bearing on the other side.

At 140 is shown an agitator similar to 14' and mounted in the same manner as 14'. The agitators are best operated in opposite directions, with the result that the agitation and other results explained in connection with the embodiment shown in Figs. 2 and 3 is increased.

It will be apparent to those skilled in the art that a tank having walls or a bottom of any suitable shape may be employed, and that any suitable means for driving the contents against such walls may be used.

I have illustrated this embodiment of my invention and these details for the purpose of describing my invention. I do not wish to be limited thereto, as it will be apparent to those skilled in the art that numerous and extensive departures may be made therefrom without departing from the spirit of the invention.

I claim:—

1. In a device of the class described, the combination of a tank having inclined side walls and an inwardly projecting upwardly inclined bottom, a propeller positioned closely adjacent a meeting place of the bottom and side of said tank, a shaft upon which the propeller is mounted extending through a side wall of the tank and adapted when operated to drive the contents of the tank against the inclined part of the bottom and thence against the oppositely inclined side walls of the tank.

2. In a device of the class described, the combination of a curved walled tank having a projection in the bottom entirely below the top of the side walls of the tank and which inclines from one side upwardly toward the other side of the tank and means for driving the liquid contents of the tank against the inclined side of the bottom and thence against one of the walls of the tank.

3. In a device of the class described, the combination of a tank, an inclined projection in the bottom submersible in said tank and means for driving the contents of the tank in a horizontal direction against the inclined wall of the projection.

4. In a device of the class described, the combination of a tank having an inclined projection in the bottom thereof and a propeller in the tank mounted upon a horizontal shaft passing through the wall of the tank for driving the liquid contents of the tank against the inclined wall of said projection.

5. In a device of the class described, the combination of a cylindrical tank having an inclined projection in the bottom thereof, a propeller mounted in said tank adjacent said bottom upon a horizontal shaft passing through the side walls of the tank and adapted when operated to drive the liquid contents of the tank against the inclined wall of the projection which deflects it upwardly against the curved side walls of the tank.

6. The method of exposing the liquid contents of a tank to the walls thereof uniformly and quickly, which consists in driving the contents of the tank from a position closely adjacent a meeting place of the bottom and side thereof against an inclination of the bottom of the tank, deflecting the contents vertically against the inclined side walls of the tank, distributing the liquid to the right and left along the side walls and returning it to the projecting means.

7. In a device of the class described, the combination of means for projecting liquid in a solid stream, an inclination for deflecting the liquid vertically from its course, inclined walls in a tank against which the liquid is deflected and which in turn causes it to flow some to the right and some to the left back to the propelling means.

8. In a device of the class described, the combination of a vessel provided with a projection having an inclined wall, means to drive the liquid contents of said vessel against the inclined part of said wall from which it is deflected vertically and said vessel being provided with other inclined walls against which the liquid deflected from the first-named wall impinges and is deflected some to the right and some to the left back to the driving means.

9. In a device of the class described, the combination of a cylindrical tank having a reëntrant bottom spherically curved substantially from side to side of the tank and a propeller on a horizontal shaft near the bottom of the tank for driving the contents of the tank against the curved reëntrant bottom and the curved side walls of the tank.

10. In a device of the class described, the combination of means for projecting liquid in a solid stream, second means for drawing said stream of liquid away from the first means, an inclination for deflecting the stream projected by the first named means and drawn by the second named means from its course, inclined walls of a tank against which the deflected stream of liquid impinges and which in turn causes it to flow some to the right and some to the left back to the first named propelling means.

11. In a device of the class described, the combination of a tank cylindrical with respect to the vertical axis and having a vertically curved bottom, a propeller shaft passing through the side walls of the tank adjacent the bottom, a propeller on the end of the shaft in the tank and located close to the bottom of the tank and that portion of the side wall through which the shaft projects.

12. In a device of the class described, the combination of a tank having curved side walls adapted to deflect fluid, projected in vertical planes thereagainst, toward the central part of the tank, a propeller shaft passing through a portion of the cylindrical walls of the tank near the bottom thereof and a propeller in said tank on said shaft located close to the portion of the cylindrical side walls through which the shaft projects and near the bottom of the tank adapted when operated to cause the liquid contents of the tank to be projected in a substantially vertical plane against the curved side walls of the tank at points of relatively great curvature.

13. In a device of the class described, the combination of a tank having walls diverging in three directions from a position closely adjacent the meeting of the bottom and side walls of the tank, and a propeller in said tank adjacent said position, adapted when operated to drive the contents of the tank against such walls simultaneously.

14. In a device of the class described, the combination of a tank having walls diverging in three directions from a position where the bottom and side walls of the tank meet, a propeller closely adjacent said position adapted when operated to drive the contents of the tank against said walls simultaneously, and other walls opposite said walls for deflecting said contents and returning it to said propeller.

15. In a device of the class described, the combination of a tank and a propeller mounted closely adjacent a meeting place of the bottom and side of the tank and adapted to be submerged as long as there is an appreciable amount of liquid in the tank, the vertical walls of the tank diverging from the propeller and adapted to deflect to the opposite walls of the tank liquid thrown about in a vertical plane and against said diverging walls toward the opposite walls of the tank, such opposite walls being inclined to deflect the liquid back to the propeller.

In witness whereof, I have hereunto signed my name this 25 day of August, 1917.

NIELS D. NIELSEN.